(12) United States Patent
Okubo

(10) Patent No.: US 10,791,202 B2
(45) Date of Patent: Sep. 29, 2020

(54) INFORMATION PROCESSING APPARATUS, PROGRAM, AND CONTROL METHOD FOR DETERMINING PRIORITY OF LOGICAL CHANNEL

(71) Applicant: CANON KABUSHIKI KAISHA, Tokyo (JP)

(72) Inventor: Yuzuru Okubo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 369 days.

(21) Appl. No.: 14/404,424

(22) PCT Filed: May 13, 2013

(86) PCT No.: PCT/JP2013/003028
§ 371 (c)(1),
(2) Date: Nov. 26, 2014

(87) PCT Pub. No.: WO2013/179584
PCT Pub. Date: Dec. 5, 2013

(65) Prior Publication Data
US 2015/0120882 A1 Apr. 30, 2015

(30) Foreign Application Priority Data

May 30, 2012 (JP) ................................ 2012-122914

(51) Int. Cl.
*H04L 29/06* (2006.01)
*H04L 12/867* (2013.01)
(Continued)

(52) U.S. Cl.
CPC ............ *H04L 69/16* (2013.01); *H04L 47/629* (2013.01); *H04L 47/6275* (2013.01); *H04L 47/6285* (2013.01); *H04L 65/60* (2013.01)

(58) Field of Classification Search
CPC .. H04L 69/16; H04L 47/6275; H04L 47/6285; H04L 47/629; H04L 65/60
(Continued)

(56) References Cited

U.S. PATENT DOCUMENTS 6,205,140 B1 * 3/2001 Putzolu ............ H04N 21/23614
370/389
6,230,200 B1 * 5/2001 Forecast ................... G06F 9/50
709/219

(Continued)

FOREIGN PATENT DOCUMENTS

| JP | 2002-171285 A | 6/2002 |
|---|---|---|
| JP | 2005-168002 A | 6/2005 |

(Continued)

OTHER PUBLICATIONS

Belshe, M., Peon, R.: SPDY Protocol, Internet draft, Internet Engineering Task Force, retrieved from https://tools.ietf.org/html/draft-mbelshe-httpbis-spdy-00, Feb. 2012.*

(Continued)

*Primary Examiner* — Nicholas R Taylor
*Assistant Examiner* — Chong G Kim
(74) *Attorney, Agent, or Firm* — Canon U.S.A., Inc. IP Division

(57) ABSTRACT

If a plurality of streams and an environment in which a dependent relationship exists between the streams are assumed, fairness may not be maintained by a conventional technique. The priority of a stream is determined by the dependent relationship between the streams.

15 Claims, 12 Drawing Sheets

(51) Int. Cl.
*H04L 12/863* (2013.01)
*H04L 12/865* (2013.01)

(58) Field of Classification Search
USPC .......................................................... 709/219
See application file for complete search history.

(56) References Cited

U.S. PATENT DOCUMENTS

| | | | | |
|---|---|---|---|---|
| 6,278,691 | B1* | 8/2001 | Ohyama | H04Q 11/0478 348/14.11 |
| 6,724,740 | B1* | 4/2004 | Choi | H04B 1/707 370/335 |
| 7,443,872 | B1* | 10/2008 | Corbett | H04L 12/66 370/431 |
| 7,818,444 | B2* | 10/2010 | Brueck | H04L 29/06027 709/231 |
| 8,020,083 | B1* | 9/2011 | Kembel | G06F 17/30899 709/224 |
| 8,285,808 | B1* | 10/2012 | Joel | G06F 17/30905 345/473 |
| 8,380,244 | B2* | 2/2013 | Gorsuch | H04W 48/18 455/553.1 |
| 8,606,951 | B2* | 12/2013 | Green | H04N 21/238 709/231 |
| 8,856,354 | B1* | 10/2014 | Mukerji | H04L 47/10 709/223 |
| 9,083,583 | B1* | 7/2015 | Roskind | H04L 29/0809 |
| 9,203,684 | B1* | 12/2015 | Belshe | H04L 29/06 |
| 2001/0015956 | A1* | 8/2001 | Ono | H04L 1/0007 370/229 |
| 2002/0080721 | A1* | 6/2002 | Tobagi | H04L 29/06 370/236 |
| 2002/0191540 | A1* | 12/2002 | Fujii | H04L 47/10 370/229 |
| 2004/0015591 | A1* | 1/2004 | Wang | H04L 47/10 709/228 |
| 2004/0120256 | A1* | 6/2004 | Park | H04L 47/10 370/235 |
| 2005/0100022 | A1* | 5/2005 | Ramprashad | H04L 47/10 370/395.42 |
| 2005/0144303 | A1* | 6/2005 | Zhang | H04L 69/163 709/231 |
| 2005/0243849 | A1* | 11/2005 | Wentink | H04L 1/0057 370/412 |
| 2006/0161677 | A1* | 7/2006 | Dierks, Jr. | H04L 49/90 709/232 |
| 2007/0053432 | A1* | 3/2007 | Kondo | H04N 19/105 375/240.12 |
| 2007/0076621 | A1* | 4/2007 | Malhotra | H04L 47/10 370/252 |
| 2007/0192330 | A1 | 8/2007 | Kanada | |
| 2007/0201563 | A1* | 8/2007 | Yamaguchi | H04L 1/1854 375/240.26 |
| 2008/0195743 | A1* | 8/2008 | Brueck | H04L 29/06027 709/231 |
| 2009/0028151 | A1* | 1/2009 | Schmidt | H04L 47/10 370/392 |
| 2009/0043906 | A1* | 2/2009 | Hurst | H04N 21/23439 709/231 |
| 2009/0046595 | A1* | 2/2009 | Clark | H04L 43/0829 370/252 |
| 2009/0213850 | A1* | 8/2009 | Viger | H04L 47/10 370/389 |
| 2009/0316719 | A1* | 12/2009 | Baron | H04L 12/4633 370/465 |
| 2009/0327510 | A1* | 12/2009 | Edelman | H04L 47/10 709/231 |
| 2010/0008245 | A1* | 1/2010 | Viger | H04L 47/193 370/252 |
| 2010/0080126 | A1* | 4/2010 | Higashida | H04L 12/5693 370/235 |
| 2010/0150154 | A1* | 6/2010 | Viger | H04L 12/4633 370/389 |
| 2010/0161824 | A1* | 6/2010 | Viger | H04L 12/4633 709/231 |
| 2010/0202508 | A1* | 8/2010 | Karaoguz | H04N 21/2381 375/240.01 |
| 2011/0035507 | A1* | 2/2011 | Brueck | H04L 29/06027 709/231 |
| 2011/0054878 | A1* | 3/2011 | Zhang | G06F 11/3419 703/21 |
| 2011/0060974 | A1* | 3/2011 | Viger | H04L 1/0041 714/800 |
| 2011/0194439 | A1* | 8/2011 | Maze | H04L 49/901 370/252 |
| 2011/0225303 | A1* | 9/2011 | Engebretson | H04L 47/193 709/227 |
| 2011/0276699 | A1* | 11/2011 | Pedersen | H04L 45/24 709/227 |
| 2011/0310957 | A1* | 12/2011 | Le Floch | H04L 47/2416 375/240.2 |
| 2012/0030338 | A1* | 2/2012 | Zhang | G06F 11/3419 709/223 |
| 2012/0254456 | A1* | 10/2012 | Visharam | H04N 21/2343 709/231 |
| 2013/0007223 | A1* | 1/2013 | Luby | H04N 21/23106 709/219 |
| 2014/0297723 | A1* | 10/2014 | Wada | G06F 17/30902 709/203 |
| 2015/0350100 | A1* | 12/2015 | Biderman | H04L 47/6215 709/219 |
| 2015/0358385 | A1* | 12/2015 | Ruellan | H04L 67/02 709/203 |

FOREIGN PATENT DOCUMENTS

JP 2007-201884 A 8/2007
JP 2009-60660 A 3/2009

OTHER PUBLICATIONS

Belshe, M., Peon, R., Thomson, M., Melnikov, A.: Hypertext Transfer Protocol version 2.0. Internet draft, Internet Engineering Task Force, retrieved http://tools.ietf.org/html/draft-ietf-httpbis-http2-09, Dec. 2013.*

Ford, Bryan. "Structured streams: a new transport abstraction." Proceedings of the 2007 conference on Applications, technologies, architectures, and protocols for computer communications. pp. 361-372. (Year: 2007).*

* cited by examiner

[Fig. 1]
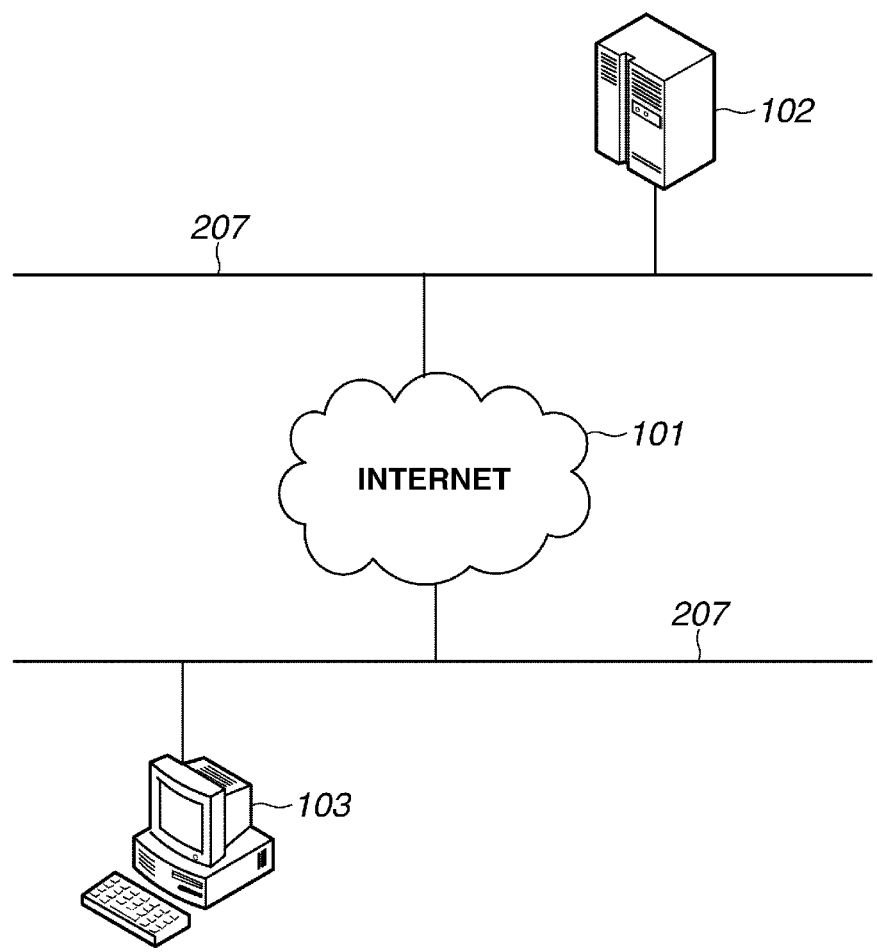

[Fig. 2]
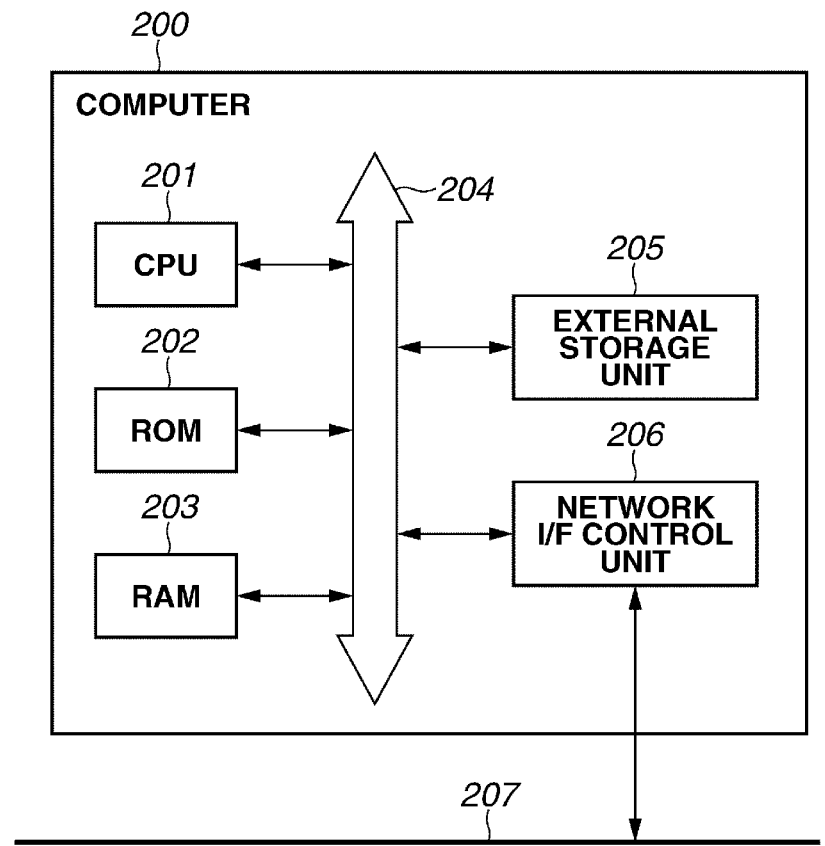
[Fig. 3]
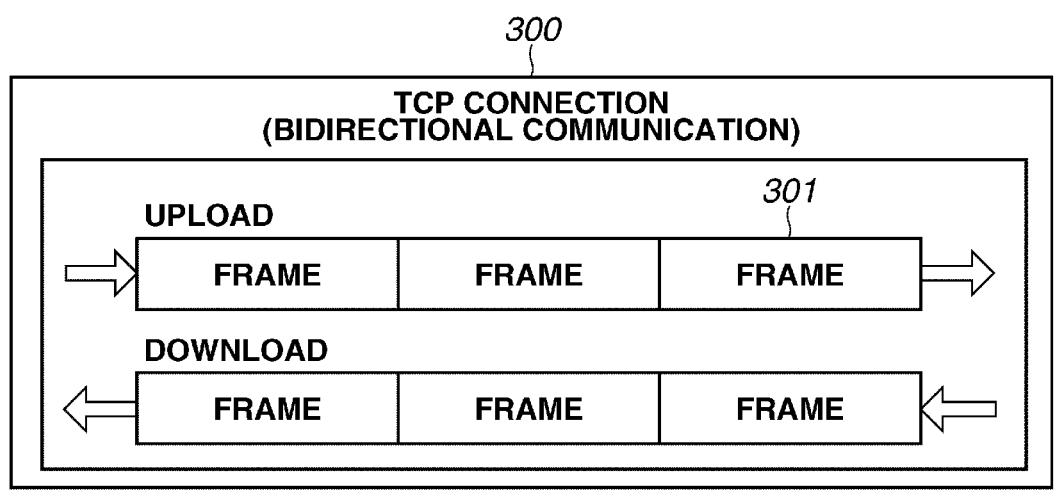

[Fig. 4]
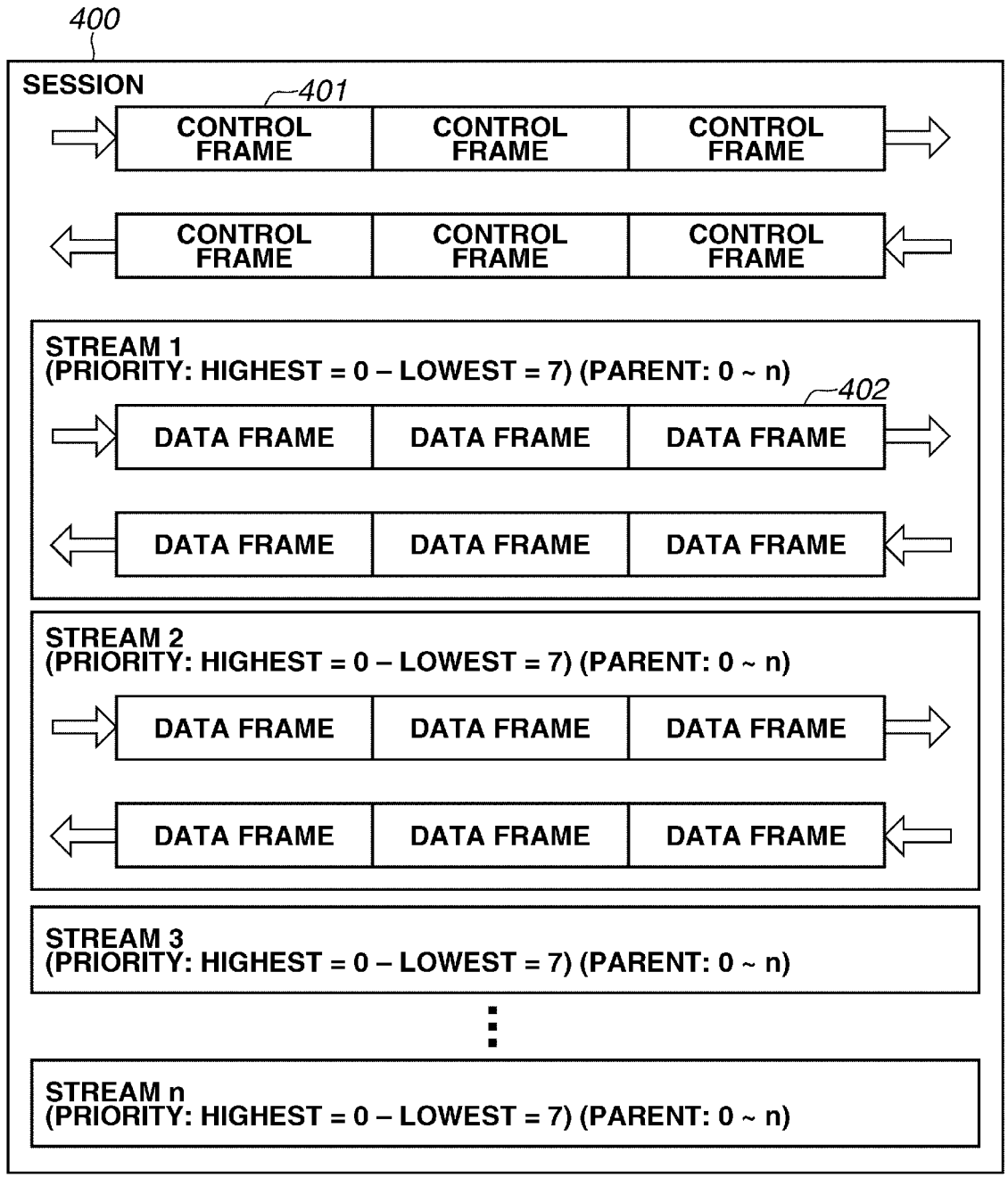

[Fig. 5]
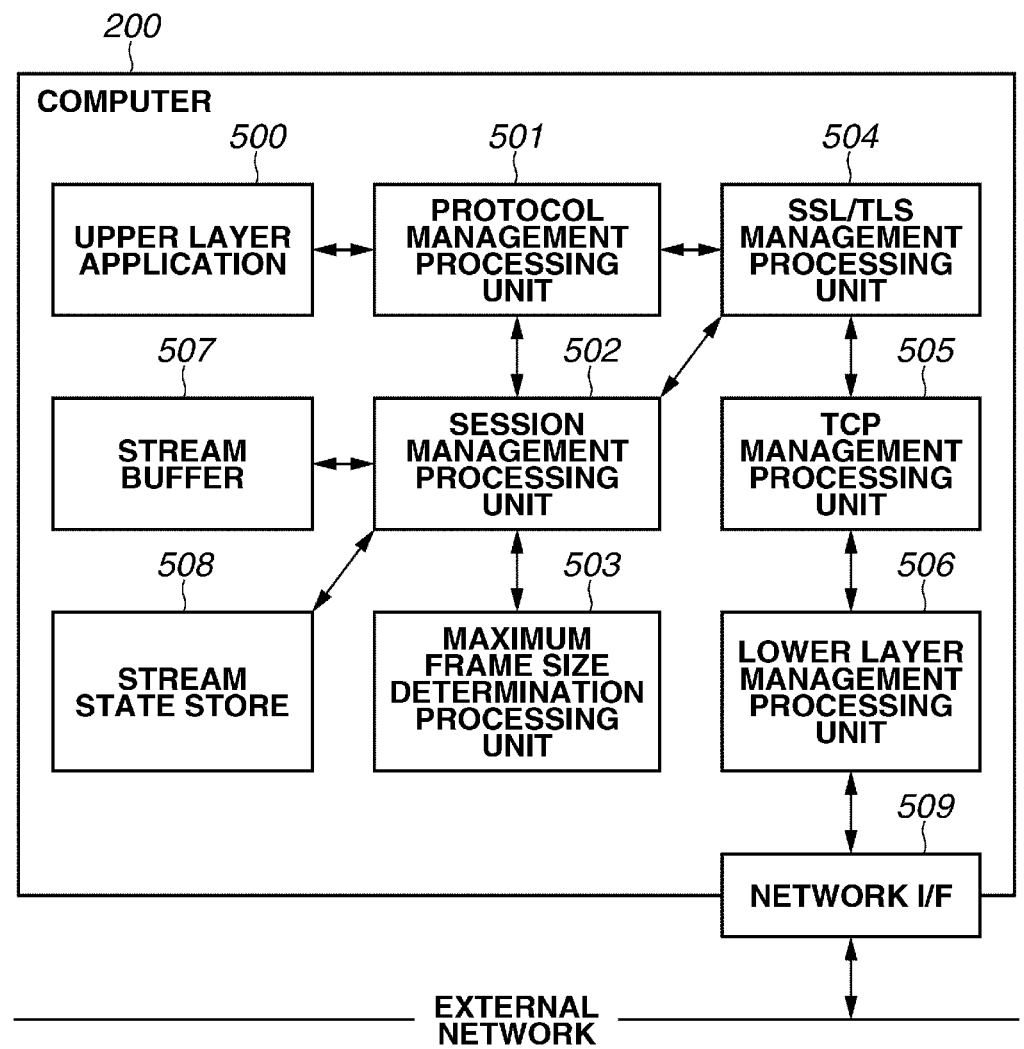

[Fig. 6]
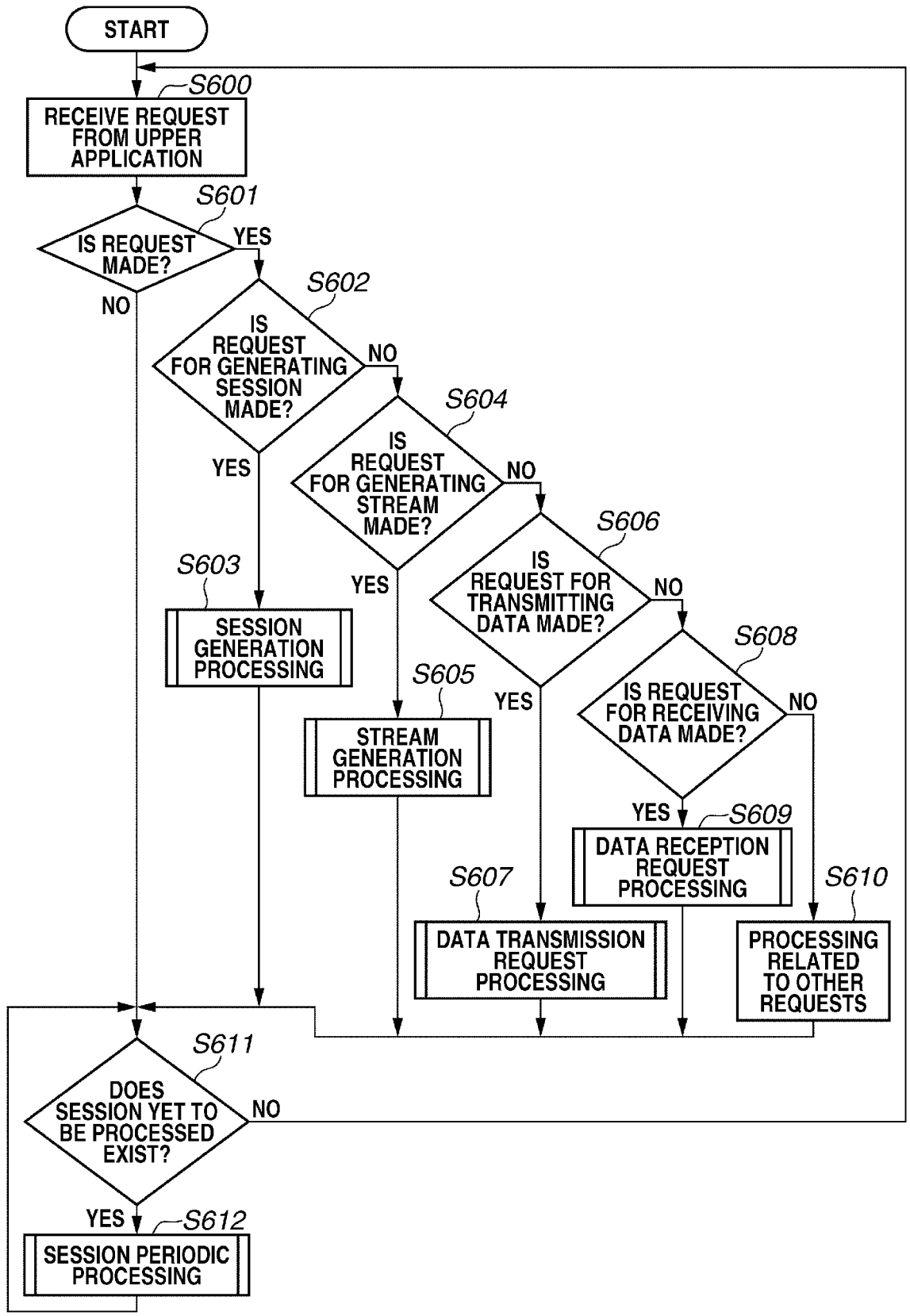

[Fig. 7]
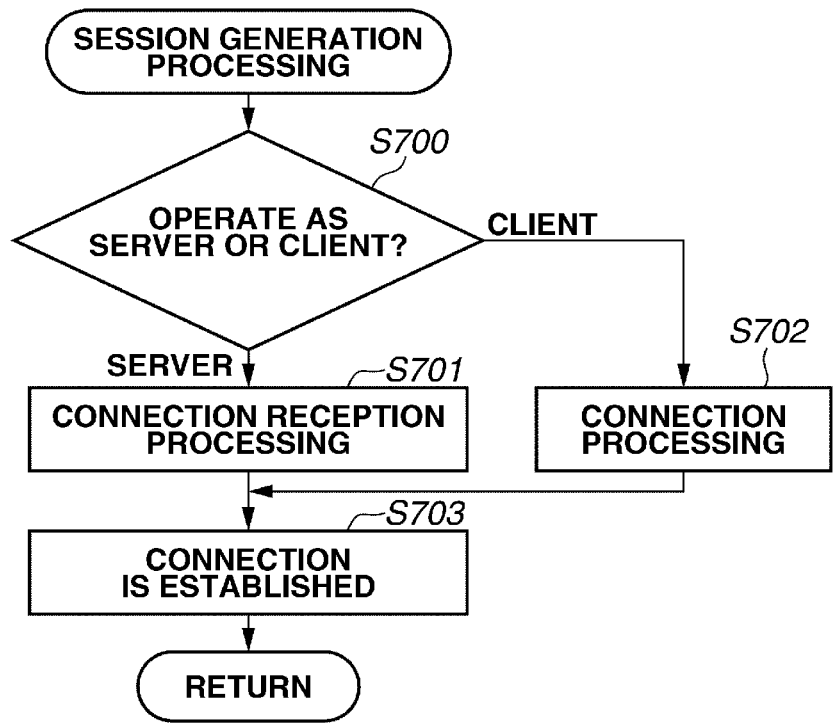
[Fig. 8]
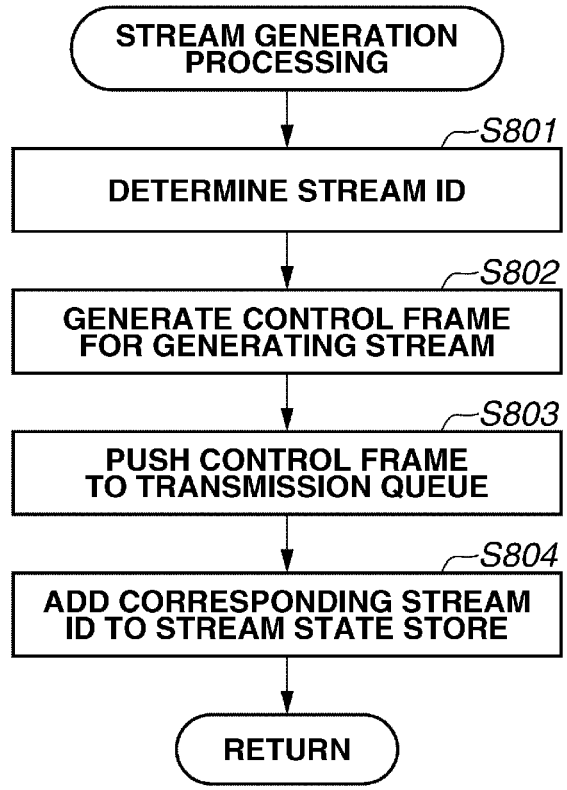

| | PRIORITY | NUMBER OF STREAMS | |
|---|---|---|---|
| LOW | 3 | 2 | |
| ↓ | 2 | 1 | NUMBER OF PRIORITIES = 4 |
| | 1 | 0 | |
| HIGH | 0 | 0 | |

| | PRIORITY | NUMBER OF STREAMS |
|---|---|---|
| LOW | 3 | 2 |
| ↓ | 2 | 1 |
| | ~~1~~ | ~~0~~ |
| HIGH | ~~0~~ | ~~0~~ |

↓

*1602*

| | PRIORITY | NUMBER OF STREAMS | |
|---|---|---|---|
| LOW | 1 | 2 | NUMBER OF PRIORITIES = 2 |
| ↓ HIGH | 0 | 1 | |

[Fig. 10A]
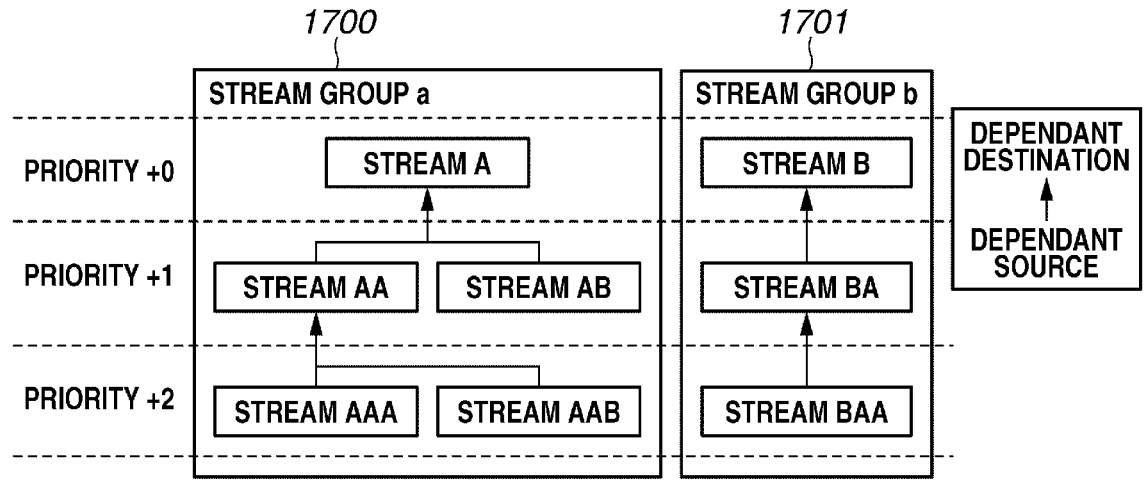
[Fig. 10B]
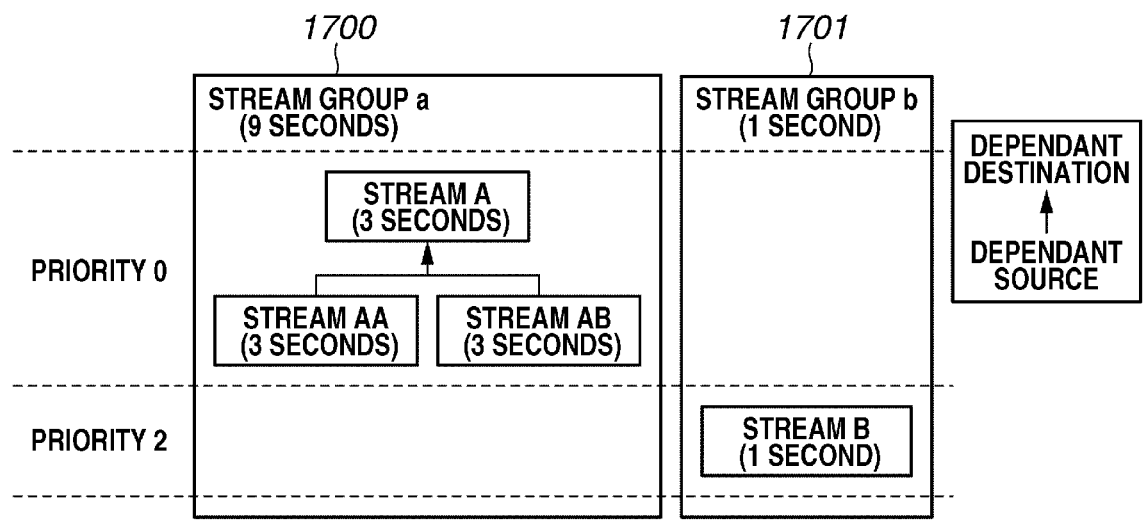
[Fig. 10C]
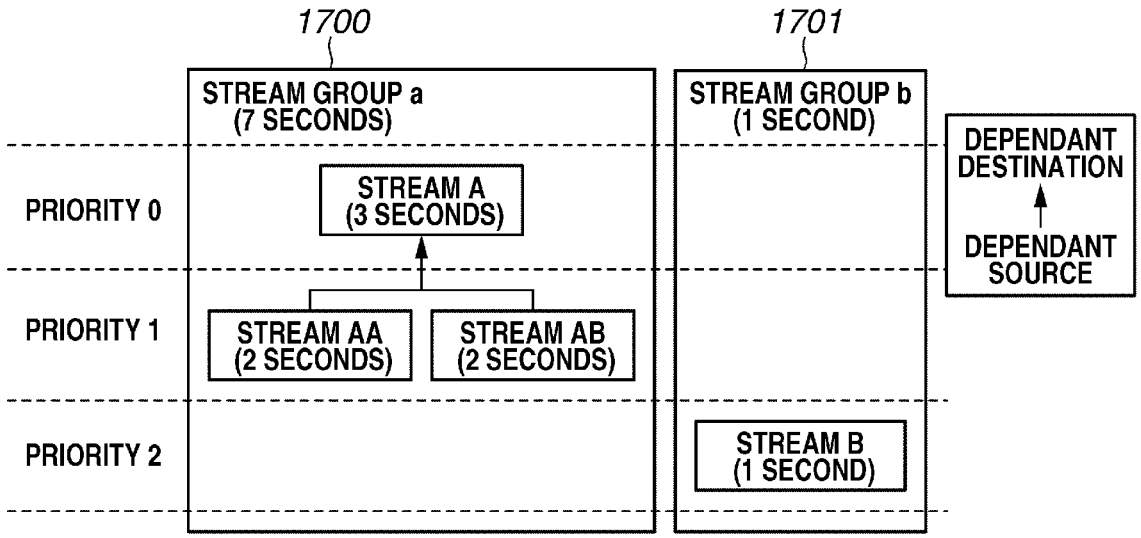

[Fig. 11]
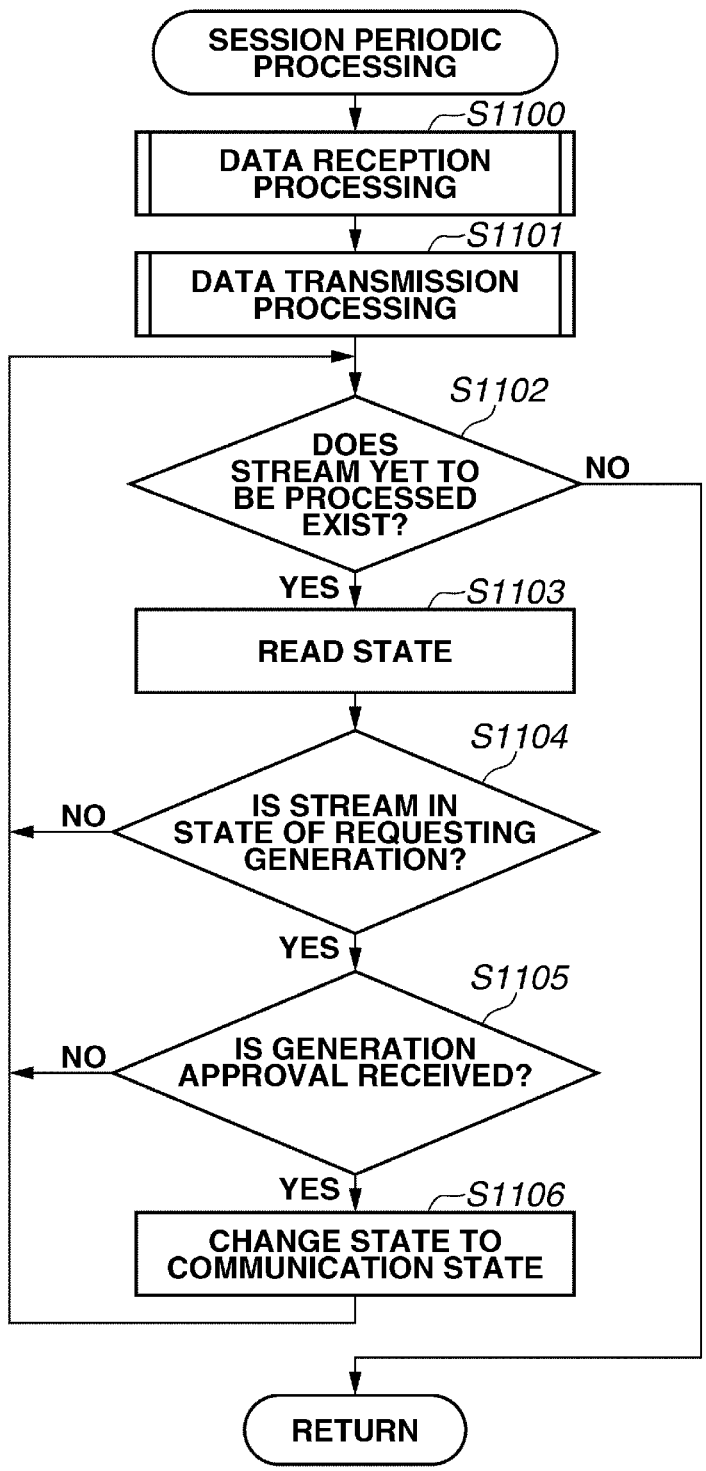

[Fig. 12]
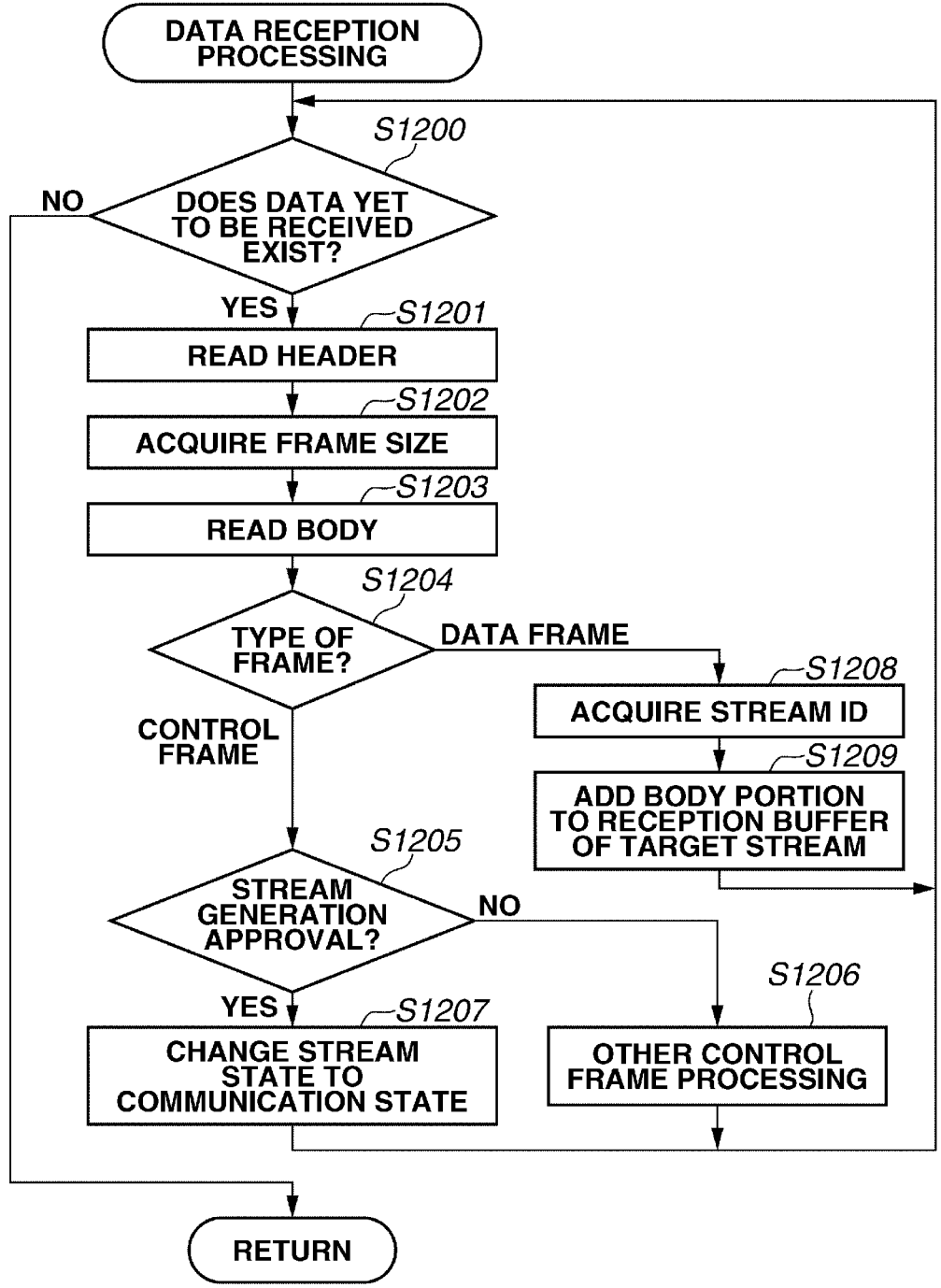

[Fig. 13]
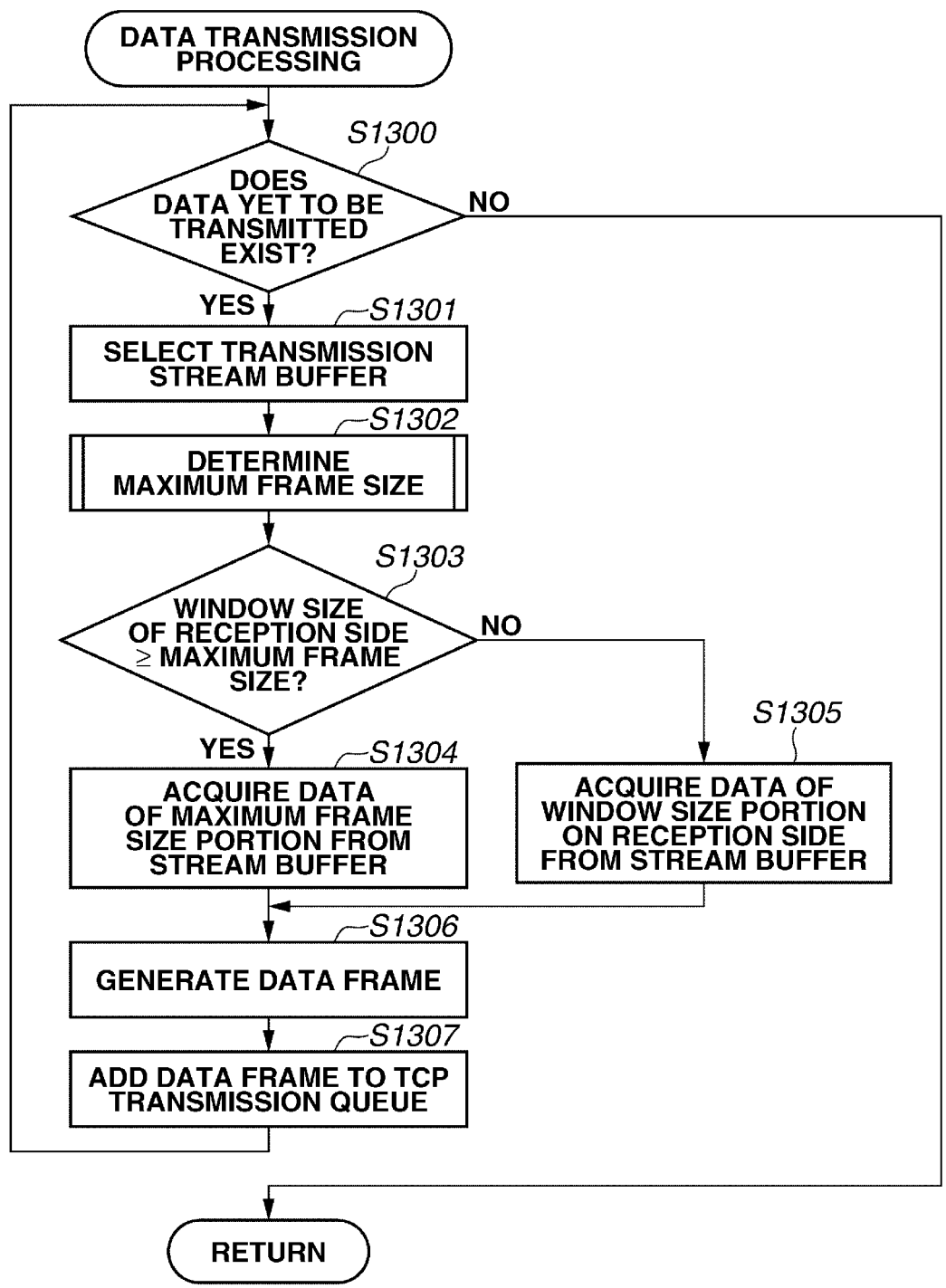

[Fig. 14]
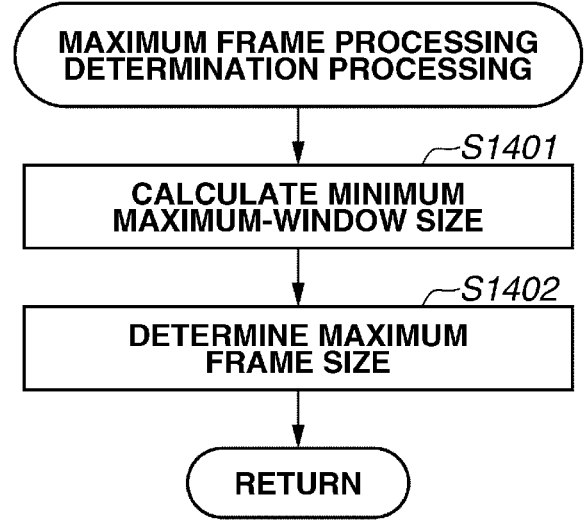
[Fig. 15]
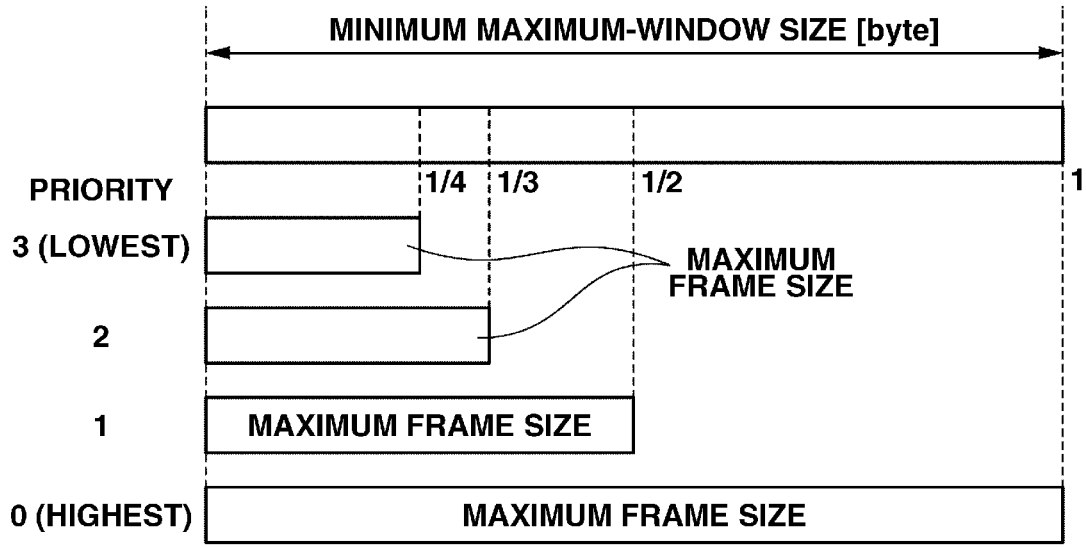

INFORMATION PROCESSING APPARATUS, PROGRAM, AND CONTROL METHOD FOR DETERMINING PRIORITY OF LOGICAL CHANNEL

TECHNICAL FIELD

The present invention relates to a technique for determining the priority of a logical channel.

BACKGROUND ART

A patent literature (PTL) 1 discusses a technique for allocating the different number of clocks by a central processing unit (CPU) between both of priority packets and non-priority packets.

CITATION LIST

Patent Literature

PTL 1: Japanese Patent Application Laid-Open No. 2009-60660

SUMMARY OF INVENTION

Technical Problem

A provisional environment where there is a plurality of streams is assumed here and an environment where a dependent relationship can be held between a plurality of streams is assumed.

PTL 1 does not assume such an environment, so that the PTL 1 cannot appropriately determine the priority between dependent streams. Therefore, the following specific problems occur.

It is assumed that, if there are a stream A and a stream B that is lower in priority than the stream A, the stream B does not have a child stream dependent on the stream B but the stream A has a plurality of child streams. If the priority of the child stream of the stream A is set to the same one as the stream A, the priority of the stream B is relatively lower than a group including the child stream of the stream A and the stream A.

For this reason, a problem may occur in that data to be originally delivered by the stream B excessively delays.

Solution to Problem

According to an aspect of the present invention, an information processing apparatus including a control means for setting the maximum frame size of a second stream which is a second logic channel of a communication protocol smaller than the maximum frame size of a first stream which is a parent stream of the second stream and a first logic channel of the communication protocol, and for transmitting the frames of the first and second frames.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 1 is a network configuration diagram including a computer according to a first exemplary embodiment of the present invention.

FIG. 2 is a block diagram of a system including the computer according to the first exemplary embodiment of the present invention.

FIG. 3 is a configuration diagram of a target protocol according to the first exemplary embodiment of the present invention.

FIG. 4 is a configuration diagram of a target protocol data according to the first exemplary embodiment of the present invention.

FIG. 5 is a software configuration according to the first exemplary embodiment of the present invention.

FIG. 6 is a flow chart of a protocol management processing unit.

FIG. 7 is a flow chart of session generation processing in the protocol management processing unit.

FIG. 8 is a flow chart of stream generation processing in the protocol management processing unit.

FIG. 9A is a schematic diagram of a virtual table of a relationship between priority and stream.

FIG. 9B is a schematic diagram of a virtual table of a relationship between priority and stream.

FIG. 10A is a schematic diagram of a virtual chart of variation in priority using dependent depth.

FIG. 10B is a schematic diagram of a virtual chart of variation in priority using dependent depth.

FIG. 10C is a schematic diagram of a virtual chart of variation in priority using dependent depth.

FIG. 11 is a flow chart of session periodic processing in a session management processing unit.

FIG. 12 is a flow chart of data reception processing in a session management processing unit.

FIG. 13 is a flow chart of data transmission processing in a session management processing unit.

FIG. 14 is a flow chart of a maximum frame size determination processing unit.

FIG. 15 is a schematic diagram illustrating a method for determining a maximum frame size.

DESCRIPTION OF EMBODIMENTS

Before an exemplary embodiment is described, terms used for description, and communication protocols which the present invention targets at are defined.

The term "socket" refers to notation for discriminating and classifying communications in transmission control protocol (TCP) layers. In most cases, an internet protocol (IP) is generally used as a lower layer. In this case, the IP is a set of IP address and a port number.

The term "TCP connection" refers to one communication path in the TCP layer. Specifically, the TCP connection is a set of reception and transmission sockets.

The term "reception window size" refers to the capacity of an empty buffer on the reception side. Although the TCP also performs processing using the window size, hereinafter, if the term "window size" appears, it means the window size used in an intended upper communication protocol.

The term "stream" refers to a logical channel in the intended upper communication protocol.

The term "frame 301" refers to a block in a minimum unit in which data is segmented when actually transmitting the data. However, the frame 301 refers to a minimum data unit in the intended communication protocol independently of the frame of a data link layer used in an Open Systems Interconnection (OSI) 7 layer model proposed by the International Standardization Organization (ISO).

The term "hash table" refers to a table for connecting one character string to one character string.

The communication protocols used in the present exemplary embodiment are described below. Hereinafter, the communication protocol is referred to as a "target protocol". The target protocol uses the TCP. However, there may exist an intermediate protocol (Transport Layer Security (TLS) and Secure Socket Layer (SSL)) which maintains transmissivity with the TCP. The target protocol transfers data called the frame 301 on a TCP connection 300 to perform communication (refers to FIG. 3). The frame 301 has a frame size on a header. FIG. 4 illustrates a data structure diagram of the target protocol. The target protocol manages a communication on one corresponding TCP connection 300 as a session 400. There is one control frame 401 on one session 400. The communication related to the session 400 is performed using the control frame 401. The target protocol may hold any number of data streams 402 in addition to the control frame 401.

In the present description, the data stream is the same in meaning as the stream.

The data communication of actual upper and lower applications is performed using the data stream 402. A priority can be set on the data stream 402. For the sake of description, the number of priorities is eight steps from the topmost zero to lowermost seven. Actually, however, the number of priorities may be optional instead of eight steps.

The data stream has a stream identification (ID) whereby to identify each data stream.

The data stream 402 is caused to have a dependent relationship. If the data stream 402 has a parent, the data stream 402 can be represented by having a stream ID of the parent stream. If the data stream 402 does not have the parent, the data stream 402 can be represented by zero or not having the stream ID.

The target protocol does not have a master-slave relationship between a server and a client to evenly communicate with each other.

The data structure of the target protocol is as described above.

A simple communication procedure of the target protocol is described below. A procedure from the start to the end of data communication is described.

It is assumed that the TCP connection is established. At this point, the server and the client hold a bidirectional communication channel. The data stream 402 is generated using the control frame 401. The data stream 402 can be generated from the server side or the client side. The acquisition of web contents is cited as an example. The client needs to send a GET command of the Hypertext Transfer Protocol (HTTP) to the server to acquire the web contents. For this reason, the client requests the server to generate the data stream 402 using the content stream. The requested server accepts the request. At this moment, the client sets the priority of the data stream desired to be generated and dependent relationship. If the server accepts the request for generation, the server sends back reception permission through the control frame 401. The server can refuse to generate the data stream 402. After the data stream 402 is generated, the server and the client can request the GET of the HTTP using the generated data stream 402 or send back the GET of the HTTP. All the data are transmitted and received through the data stream 402. The data required by the client side are received and then the stream needs to be closed. At this point, the stream can be closed from the client side or the server side. Thereafter, the side requested to end the stream issues a request for ending the stream as soon as there are no data to be transmitted and ends the stream. By not issuing a request intentionally for ending the stream by one side, unidirectional communication can be performed.

As an example in which the server side generates the data stream 402, the server side may generate a new data stream 402 to respond to the GET request from the client side to dynamically push contents to the client. As can be seen from the example, the number of streams dynamically varies according to time in the communication of the target protocol.

Example 1

A computer as an exemplary embodiment of an information processing apparatus according to the present invention is described below. FIG. 2 is a block diagram illustrating a configuration of a computer according to the present exemplary embodiment. Unless otherwise specified, as long as the function of the present invention can be executed, it is to be understood that the present invention can be applied to a single apparatus or a system formed of a plurality of apparatuses. Furthermore, unless otherwise specified, as long as the function of the present invention can be executed, it is to be understood that the present invention can be applied to a system which is connected via a network such as a local area network (LAN), a wide area network (WAN), and the Internet and performs processing.

FIG. 2 illustrates a configuration of a computer 200. A client computer 103 and a server computer 102 are similar in configuration to the computer 200.

The computer 200 includes a CPU 201. The CPU 201 executes processing including figures, images, characters, and tables (including a spread sheet) based on a word processing program stored in a read only memory (ROM) for a program of a ROM 202 or an external storage unit 205. The CPU 201 generally controls each device connected to a system bus 204. The computer 200 may include input and output devices in addition to the above units.

The ROM for a program of the ROM 202 or the external storage unit 205 stores an operation system which is a control program of the CPU 201. The ROM for data of the ROM 202 or the external storage unit 205 stores various data.

A random access memory (RAM) 203 functions as a main memory and a work memory of the CPU 201. A network I/F control unit 206 controls transmission to and reception from a local area network (LAN) 207.

In FIG. 1, the LAN 207 is a communication line for transferring information between the above-described units. The Internet 101 is a communication line for exchanging information between the above units across a fire wall. The Internet 101 enables the LAN 207 to which the server computer 102 and the client computer 103 belong to communicate with each other across the fire wall. The LAN 207 and the Internet 101 are communication networks for supporting a TCP/IP protocol, for example, and may be wire or wireless networks. In FIG. 1, the server computer 102 is formed of a single server but may be formed of a plurality of server computers. Alternatively, the server computer 102 may be formed of a virtual personal computer (PC).

The CPU 201 executes processing based on a program stored in the external storage unit 205 to realize the software configuration of the computer 200 illustrated in FIG. 5 and processing of each step in a flow chart described below. In the following description, the computer 200 is similar in function to the client computer 103 or the server computer 102.

The client computer 103 and the server computer 102 need to be equipped with a mechanism for managing the target protocol to execute the present invention. The present description provides an example executed by both of the server and the client. However, the effect of the present invention can also be achieved by either the server or the client.

FIG. 5 illustrates the software configuration of the computer 200. The client computer 103 and the server computer 102 are similar in software configuration to the computer 200.

A management mechanism up to the TCP layer may use any execution method as long as the mechanism satisfies request for comments (RFC) 793 (Transmission Control Protocol) and provides an available application program interface (API). In most cases, an operating system generally provides the API for operating the TCP layer. The target protocol uses the TCP, so that it cannot output performance exceeding that of the TCP.

A processing unit 504 manages the SSL and TLS layers. Although the target protocol does not need to use the SSL and the TLS, in actual, the target protocol more frequently uses the SSL and the TLS due to problems of security and fire wall, so that the SSL and the TLS are described. An SSL/TLS management processing unit 504 may use any execution method as long as the method conforms to standards (RFC 2246 and RFC 4346). The processing unit may use an intermediate protocol other than the SSL and the TLS.

A protocol management processing unit 501 is a processing unit for managing the session of the target protocol. The protocol management processing unit 501 manages the provision of an interface to an upper layer application 500 and the transmission of data to and the reception of data from a lower layer. The protocol management processing unit 501 performs not all the target protocols and entrusts a session management processing unit 502 with an actual processing.

The session management processing unit 502 manages the stream of a target session.

Each stream has a stream buffer 507 and a stream state store 508. The stream state store 508 is an area for storing the state of a stream. The stream buffer 507 has two buffers for one stream. The two buffers are ones for transmission and reception.

In FIG. 5, the stream buffer 507 and the stream state store 508 illustrate storing positions and are not programs.

In the execution of the present invention, a transmission buffer is not always essential, but the transmission buffer often improves performance in transmission and reception via a network. For this reason, the present exemplary embodiment uses a buffer for transmission. The stream buffer 507 has two buffers used for transmission and reception based on a default size when generating the stream. The default size is supposed to be previously defined in the target protocol.

For the default size of the transmission buffer, it is not essential to use the default size defined in the target protocol.

The session management processing unit 502 uses a maximum frame size determination processing unit 503 in determining the maximum frame size. The maximum frame size determination processing unit 503 is the one for calculating the maximum frame size that the stream can use. The maximum frame size determination processing unit 503 is called at a required timing and determines an appropriate maximum frame size from the maximum window size of all streams and priority.

The flow of data transmission and reception using the target protocol is described below. The detailed flows of processing in the SSL, the processing unit 504, a TCP management processing unit 505, a lower layer management processing unit 506, and transmission and reception buffers, are not described. This is because the specific processing methods are independent of the processing methods of the present invention and these execution methods are generally well known. A network I/F 509 is a software processing unit of the network I/F control unit 206.

FIG. 6 illustrates the flow of processing of the protocol management processing unit 501. A stream generation processing (S605), a data transmission request processing (S607), a data reception request processing in step S609, and a session periodic processing in step S612 are processed in a session management processing unit 502. In a case of an initial state, no session is generated, so that the protocol management processing unit 501 waits for a request for generating a session from an upper application at a request reception in step S600. If no request is made (NO in step S601), in step S601, a determination is made as to whether there exists a session yet to be processed, however, no session exists at this stage, so that the processing is returned from an upper application to the request reception in step S600. If a request for generating a session is made (YES in step S602), in step S603, a session generation processing is called.

A flow of the session generation processing is illustrated in FIG. 7.

In step S700, the protocol management processing unit 501 determines whether to operate as a server or a client according to a connection mode. More specifically, the protocol management processing unit 501 determines the processing depending on as to whether the upper layer application 500 is a browser or web server software. If the upper layer application 500 is the browser, the protocol management processing unit 501 operates as a client. If the upper layer application 500 is the web server software, the protocol management processing unit 501 operates as a server. If it is determined that the protocol management processing unit 501 operates as the server (server in step S700), in step S701, the protocol management processing unit 501 performs connection reception processing. The processing is the one that waits for the client requesting a TCP connection. If the client makes a request, the processing is finished. On the other hand, if it is determined that the protocol management processing unit 501 operates as the client (client in step S700), in step S702, the protocol management processing unit 501 performs a connection processing. The connection processing is for requesting the server of the TCP connection. If it is successful, the processing is finished. After the processing related to the connection in each mode is ended, in step S703, the TCP connection is established to enable data of the TCP layer to be transmitted and received.

If the SSL/TLS processing is also performed, the SSL/TLS processing is performed with the processing concealed in the TCP connection establishment processing. In other words, if the SSL/TLS processing is performed, the SSL/TLS processing is performed before the data is transferred to the TCP layer.

In step S703, the TCP connection is established. Thereafter, in step S603, the session generation processing is finished.

As illustrated in FIG. 7, one module performing the processing of the server and the client brings the advantage that the module can be made common among a plurality of programs.

In FIG. 6, after the session generation processing is finished in step S603, the processing returns to the request reception performed in step S600 from the upper application via step S611 described below and step S612 if needed.

In step S604, if a stream generation request is made, in step S605, the session management processing unit 502 performs the stream generation processing.

In step S606, if a data transmission request is made, in step S607, the session management processing unit 502 performs the data transmission request processing.

Similarly, in step S608, if a data reception request is made, in step S609, the session management processing unit 502 performs the data reception request processing.

The target protocol in addition to these requests may increase the type of requests. For this reason, in step S610, processing related to other requests is performed.

Finally, in step S611, it is determined whether a session yet to be processed exists. If the session yet to be processed exists (YES in step S611), in step S612, the session management processing unit 502 performs a session periodic processing. The number of times of calling the session periodic processing is equal to the number of sessions being used. The flow of processing of the protocol management processing unit 501 managing all sessions is as described above.

The flow of processing of the session management processing unit 502 is described below. As described above, the session management processing unit 502 is called by the protocol management processing unit 501. The session management processing unit 502 performs the generation, change in size, addition, acquisition, and deletion of the stream buffer 507 which is a buffer corresponding to each stream.

The flow of the stream generation processing performed in step S605 is described with reference to FIG. 8. In step S801, a stream ID is determined. The processing is performed to make the ID unique, which is attached to the stream in one session. It is necessary for the stream IDs of the streams generated from the server and client sides not to be same. For that reason, a duplication check may be performed. Alternatively, constraint of even number may be imposed on the target protocol when the stream is generated from the client side or constraint of odd number may be imposed on the target protocol when the stream is generated from the server side. After the stream ID is determined, corresponding control frame 401 is generated. In step S802, the processing generates the control frame for generating a stream according to the specifications of the target protocol. In step S803, a transmission queue is subjected to push processing of the control frame 401. The transmission queue is managed by the TCP layer. TCP management processing unit 505 performs transmission when pushing the control frame 401 into the transmission queue. In step S804, the corresponding stream ID is added to the stream state store 508 to store in the stream state store 508 the fact that a generation request is transmitted. Since a request for generating a stream is not yet received, the state is shifted to a waiting state for reception.

A data transmission request processing performed in step S607 is described below. If data is intended to be transmitted using a stream with an upper application, the processing is called via the protocol management processing unit 501. The upper application acquires the size of data desired to be transmitted. The upper application stores only the acquired data that can be stored in the empty size of the transmission buffer. This prevents the transmission data from leaking. The data is merely stored in the transmission buffer. The data is actually transmitted in the session periodic processing in step S612.

Similarly, the data reception request processing in step S609 is described below. As is the case with the data transmission request processing in step S607, the data received from a stream is desired to be obtained, the data reception request processing is called via the protocol management processing unit 501. The session management processing unit 502 is entrusted the processing by the protocol management processing unit 501 and then reads data from the reception buffer.

The session periodic processing in step S612, which is the remaining processing of the session management processing unit 502, is described below with reference to FIG. 11. This processing is called periodically for each session from the protocol management processing unit 501 and once for each effective session. In step S1100, the session management processing unit 502 receives communication data from the TCP layer and analyses the data in a data reception processing. After the data reception processing, in step S1101, the session management processing unit 502 transmits data stored in the transmission buffer of each stream in a data transmission processing. The data reception processing in step S1100 and the data transmission processing in step S1101 are described in detail below after the session periodic processing in step S612 is described. In step S1102, the session management processing unit 502 confirms whether a stream yet to be processed exists. If the stream yet to be processed exists (YES in step S1102), in step S1103, the session management processing unit 502 reads the state of the corresponding stream from the stream state store 508 in the state reading processing.

In step S1104, if the stream is in the state of requesting generation (YES in step S1104), in step S1105, the session management processing unit 502 determines whether the reception side approves generation. If the reception side approves generation (YES in step S1105), in step S1106, the session management processing unit 502 changes the state of the stream to a communication state, and the processing returns to step S1102 to confirm if the stream yet to be processed exists. If the stream is not in the state of requesting generation (NO in step S1104), or if the reception side does not approve generation (NO in step S1105), nothing is done, and the processing returns to step S1102 to confirm if the stream yet to be processed exists.

If the stream yet to be processed does not exist (NO in step S1102), the processing is ended.

The flow of a general processing of the session periodic processing performed in step S612 is as described above.

The flow of detailed data reception processing is described below with reference to FIG. 12. In step S1200, the session management processing unit 502 confirms if data yet to be received exists from the TCP layer. If the data yet to be received exists (YES in step S1200), in step S1201, a header portion is read. The frame 301 has a frame size indicating the size of data which can be stored in the frame. In step S1202, the frame size of the frame 301 is acquired. The frame size is acquired to allow grasping the position of the body portion. In step S1203, the session management processing unit 502 reads the body portion of the frame 301.

The session management processing unit 502 may stop the processing until the reception of all the body portions is ended or delay the processing until the following or subsequent session periodic processing in step S612 is performed. In other words, in general, a communication library is often asynchronous, however, the present description cites an example where the communication library is synchronous. However, when the present invention is practiced, an asynchronous processing may be performed as is the case with a general communication library.

After the session management processing unit 502 succeeds in reading the body portion, in step S1204, the session management processing unit 502 causes the processing to branch according to the type of the frame 301. If the type of the frame 301 is a control frame, in step S1205, the session management processing unit 502 determines whether the content is approval of stream generation. If the content is the approval of stream generation (YES in step S1205), in step S1207, the session management processing unit 502 changes the state of the corresponding stream to a communication state. If the content is a control frame other than the approval of stream generation (NO in step S1205), in step S1206, the session management processing unit 502 performs the processing corresponding to the type in other control frame processing. The term "other control frame processing" refers to the one uniquely defined by the target protocol, such as a refusal of approval of the stream generation or a notification of a communication speed. In the present exemplary embodiment, the processing of the control frame which is not immediately related to the transmission and reception of the data is not described. The processing in receiving the control frame is as described above.

Next, a case where the type of the frame 301 is a data frame is described. If the session management processing unit 502 determines that the received frame 301 is a data frame (data frame in step S1204), in step S1208, the session management processing unit 502 acquires the stream ID of the data stream 402 from the frame header. In step S1209, the body portion of the data frame is added to the reception buffer of the target stream.

The target protocol performs a bidirectional communication and if the notification of the reception window size is not in time, the reception buffer of the target stream of the destination may overflow. The TCP realizes a mechanism for preventing such a problem. In the present exemplary embodiment, it is assumed that the target protocol also doubly copes with the problem that the reception buffer overflows.

In the present exemplary embodiment, a detailed control of the window size of the target protocol and the overflow of the buffer is not described. However, there may be a method in which the size overflowed from the buffer is transmitted using the control frame. After the addition to the body portion, the upper application can obtain the data received by the corresponding stream. The data is added to the reception buffer of the corresponding stream, and then the processing returns again to step S1200 to confirm if the data yet to be received exists. If the received data does not exist in the TCP layer in confirming if the data yet to be received exists, the data reception processing is ended.

The flow of detailed data transmission processing is described below with reference to FIG. 13. In step S1300, the session management processing unit 502 confirms the transmission buffer of each stream to determine whether data yet to be transmitted exists. At this determination, the processing cannot be ended unless all the data yet to be transmitted are transmitted, so that the number of times of execution may be restricted to avoid the possibility that the processing falls into an infinite loop. If data yet to be transmitted exists (YES in step S1300), in step S1301, a transmission stream buffer is selected to determine which stream data is transmitted out of the stream data including data yet to be transmitted. The processing is determined by the priority of the stream. If the priority is high, the transmission stream buffer needs to be frequently selected. If the priority is low, the transmission stream buffer needs to be less frequently selected.

After the transmission stream buffer is selected, in step S1302, the maximum frame size is determined. The maximum frame size determination processing unit 503 determines the maximum frame size and calculates the optimum maximum frame size for the stream. The flow of detailed processing for determining the maximum frame size is described below.

After the maximum frame size is determined, in step S1303, the session management processing unit 502 compares a window size on the reception side with the maximum frame size. If the window size on the reception side is larger than the maximum frame size (YES in step S1303), in step S1304, the maximum frame size portion is acquired from the stream buffer 507. On the other hand, if the maximum frame size is larger than the window size on the reception side (NO in step S1303), in step S1305, a window size portion on the reception side is acquired from the stream buffer 507. Although not particularly illustrated in FIG. 13, if the transmission stream buffer stores data less than the window size portion, all data is acquired. After the session management processing unit 502 acquires data to be transmitted, in step S1306, the session management processing unit 502 generates a data frame using the acquired data. Finally, in step S1307, the generated data frame is added to the transmission queue of the TCP layer. If the generated data frame cannot be added thereto because the transmission queue of the TCP layer overflows, measures for avoidance needs to be taken separately such as separate queuing or asynchronous processing. After the data frame is added to the transmission queue, the processing returns to step S1300 to determine whether data yet to be transmitted remains. If data yet to be transmitted does not exist (NO in step S1300), the data transmission processing is finished.

The flow of the maximum frame size determination processing called in the data transmission processing is described in detail below with reference to FIG. 14. In step S1400, the maximum frame size determination processing unit 503 calculates a minimum maximum-window size. The term "minimum maximum-window size" refers to the minimum window size in the maximum reception window size of each stream. This is calculated to take in consideration the situation where the reception window size is dynamically changed.

The minimum maximum-window size is selected to simplify the processing, however, an average of the maximum window size of each stream may be used. If the calculated value exceeds the reception window size of the corresponding stream, the value needs to be restricted to the reception window size. In step S1401, the maximum frame size is determined.

In the present invention, the higher the priority of the stream is, the greater the maximum frame size is, and the lower the priority of the stream is, the smaller the maximum frame size is. As an example, as illustrated in FIG. 15, the maximum frame size can be determined by the following equation.

maximum frame size=minimum maximum-window size/(priority+1).

In addition to the above example, a calculation method may be used in which the maximum frame size is arithmetically limited. In other words, the frame size may be decreased at a regular interval each time priority is lowered.

After the maximum frame size determination processing unit 503 determines the maximum frame size, the processing is ended.

Thereby, a quick response to the stream high in priority can be made. Therefore, a response speed can be increased for a request with a high priority from the web application.

An example is described below in which priority is determined using the dependent relationship of the stream.

In the description of the data structure of the target protocol, each stream is allowed to have a dependent relationship. If a stream is dependent on another stream, a parent-and-child relationship may be represented by having its stream ID. The target protocol is capable of transmitting and receiving a plurality of streams in parallel at the same time. For this reason, various protocols and applications can exist in the upper layer of the target protocol at the same time. If a protocol or an application desires to further have a stream for a certain stream, a dependant relationship can be set using an original stream as a parent.

In a case of the target protocol in which the client or the server can freely determine the priority of the stream, a part of a protocol or an application can produce a large number of streams high in priority. In FIG. 10A, for example, a stream group a 1700 includes five child-streams and a stream group b 1701 includes three child-streams. If the stream group a 1700 generates all streams with a high priority, the band of the stream group b 1701 is pressed not to allow the band to be fairly used.

As an example in which a plurality of stream groups is produced in the same session, an example is cited in which communication is performed using the HTTP and a WebSocket. In other words, the stream group a communicates using the HTTP and the stream group b communicates using the WebSocket.

In the maximum frame size determination performed in step S1401, priority is lowered according to the depth of the dependent relationship to determine the maximum frame size.

In FIG. 10A, there is a parent stream which does not depend on any stream. Streams A and B are parent streams in FIG. 10. The two streams are the lowest in the dependent relationship, so that priority is not changed. Streams AA, AB, and BA which take the streams A and B as parents are deeper by one in the dependent relationship. For this reason, the session management processing unit 502 lowers the priority by one in consideration of the dependent relationship. Similarly, processing is performed in which the priority is set to be lower as the stream is deeper in the dependent relationship.

If the priority exceeds the range of the priority which can be set by the target protocol, processing which causes the priority to fall within the range of the priority is required. More specifically, if the lowest priority of the target protocol is seven and the priority of the target protocol whose priority is lowered is already seven, the priority of the target protocol is kept at seven.

Examples in which specific effects are produced by the method described in FIG. 10A are described below by comparing FIG. 10B with FIG. 10C.

The following is an example the priority determined by the method described with respect to FIG. 10A is applied to time allocated by the CPU of the computer 200. Although it is not practical that the CPU allocates time to the processing of the stream in units of seconds, for the sake of simplicity, the example is described in units of seconds. Specifically, three seconds are allocated to the processing of the stream whose priority is zero, two seconds are allocated to the processing of the stream whose priority is one, and one second is allocated to the processing of the stream whose priority is two.

In FIGS. 10B and 10C, the priority of the stream A is zero and the priority of the stream B is two. The stream A has two child streams and the stream B is a parent stream.

FIG. 10B is an example in which the priority of a child stream is not changed based on the degree of dependence. As a result, nine seconds in total are required for processing the stream group a. One second is required for processing the stream group b.

FIG. 10C is an example in which the priority of a child stream is changed based on the degree of dependence. As a result, the processing time required for the child stream of the stream A is decreased, so that seven seconds in total are required for processing the stream group a. Similarly, one second is required for processing the stream group b.

In FIG. 10B, the ratio of the processing time of the stream group a to that of the stream group b is 9 to 1. In FIG. 10C, the ratio thereof is 7 to 1. The unfair environment between the stream groups in FIG. 10C is slightly improved than that in FIG. 10B.

The example of the processing time described above is the one for a method for performing the processing using priority. As another method for performing the processing using priority, there are a method for changing a rate at which the CPU performs processing and a method for changing an order in which a stream is transmitted. The priority may be used only for performing processing in the computer 200 or the determined priority is input to the header of the IP packet including the frame of the stream, and the IP packet to which the priority is input may be transmitted. In the method for inputting the priority to the header of the IP packet, the router or the computer receiving the IP packet can use the priority.

Lowering the priority of the stream close in the dependant relationship allows fairly sharing a communication band with other stream groups even if a part of stream groups produces a large number of child streams.

It is optional whether to change the frame size of the child stream after the priority of the child stream is determined Only the priority may be determined as a priority lower than that of a parent stream without changing the frame size of the child stream. The above configuration can improve fairness between the stream groups a and b.

Example 2

In the maximum frame size determination processing performed in step S1401 in Example 1, the method is described in which an optimum maximum frame size is determined by the maximum window size and priority of each stream. In a second exemplary embodiment, an example in which the maximum frame size can be adjusted more dynamically with respect to a model in which the number and the priority of a stream vary.

A method for determining an optimum maximum frame size in the present exemplary embodiment is described below with reference to FIG. 9. FIG. 9 illustrates the number of streams to which each priority belongs. FIG. 9A illustrates a state 1600 of each stream and priority when performing the processing similar to that in the example 1. There is assumed the target protocol with the highest priority of zero and the lowest priority of three. Needless to say, actually, the number of priorities in a protocol specification is optional. There are three streams in FIG. 9A, two streams lowest in priority and one stream slightly low in priority. There is no stream higher in priority than the three streams in FIG. 9A. This is the state where streams high in priority (priority is zero and one) do not exist, however, such a state can exist, because the target protocol can freely determine the priority. Such a state can exist immediately after the stream high in priority finishes communication. The method for determining the maximum frame size as illustrated in the example 1 is used in this state to substantially and excessively force the stream whose priority is two or three on the restriction of the frame size. This produces an overhead of the frame header to be liable to lower communication speed.

As illustrated in FIG. 9B, the number of priorities of the protocol is originally four, however, the priorities which are not used are filled with the streams whose priorities are already used are filled to solve this problem. A table 1601 in FIG. 10B is the one that indicates a relationship between actual priority and stream. A table 1602 in FIG. 10C is the one that indicates a relationship between actual priority and stream with the priorities filled with the streams. In FIG. 10B, this execution allows the type of priority to be substantially handled as two protocols. When the maximum frame size is determined by the priority described in Example 1, the frame size can be made larger in FIG. 10B than FIG. 10A.

According to the present exemplary embodiments described above, if there is temporarily no stream high in priority, the number of priorities is virtually varied according to situations to allow the overhead of a frame-header portion to be decreased, thereby improving the communication speed.

The exemplary embodiments of the present invention are described above in detail. The present invention may be applied to a system formed of a plurality of apparatuses.

The present invention may be applied to an apparatus formed of one appliance including a case where the apparatus is formed of a virtualized OS or to a system in which an information processing apparatus is formed of cloud computing via the Internet.

The present invention can be achieved in such a manner that the software program realizing the functions of the above exemplary embodiments is supplied directly or remotely to a system or an apparatus, and the computer of the system or the apparatus reads and executes the program. In this case, the form of the software is not necessarily a program so long as the software has the function of a program.

The execution environment of the program includes a personal computer, a virtual PC in which an operation system in the personal computer is virtualized, or a remote PC.

The execution environment further includes a case where the program is executed by a computer built in an image processing apparatus, a printer, or a multifunction peripheral (MFP).

Therefore, the program code itself installed in the computer to realize the function processing of the present invention by the computer realizes the present invention. In other words, the computer program itself for realizing the function processing of the present invention is also included in the claim of the present invention. In that case, as long as the program has its function, the form of a program such as a program executed by an object code or an interpreter and script data supplied to the OS is not limited.

Various recording media for supplying a program can be used.

For example, a floppy (registered trademark) disk, a hard disk, an optical disk, a magneto optical (MO) disk, a compact disk read only memory (CD-ROM), a compact disk readable (CD-R), a compact disk readable writable (CD-RW), a magnetic tape, a nonvolatile memory, a nonvolatile memory card, a read only memory (ROM), and a digital versatile disk (DVD) can be used.

The program can also be supplied in such a manner that a computer is connected to a home page of the Internet using the browser of a client computer and a program is downloaded to a recoding medium such as a hard disk from the home page. In this case, the computer program itself of the present invention or a compressed file including an automatic install function may be downloaded. The program can also be supplied in such a manner that the program codes forming the program of the present invention are divided into a plurality of files and their respective files area downloaded from different home pages. In other words, the claim of the present invention also includes a World Wide Web (WWW) server which causes a plurality of users to download a program file for the computer realizing the function processing of the present invention.

The encrypted program of the present invention may be stored in a storage medium such as a DVD-ROM and distributed to users. In this case, a user who satisfies a predetermined condition is caused to download key information for decipherment from a home page via the Internet and the key information is used to install the ciphered program into the computer in an executable form.

The computer executes the read program to allow realizing the function also in a form other than the form realizing the function of the above exemplary embodiment. For example, the OS operating on the computer performs a part of or all of the actual processing based on instructions of the program and the function of the above exemplary embodiment can be realized by the processing.

The program read from the recording medium may be stored in a memory provided on an extension board inserted into the computer or an extension unit connected to a computer. In this case, thereafter, the CPU provided on the extension board or the extension unit performs a part of or all of the actual processing based on instructions of the program and the function of the above exemplary embodiment can be realized by the processing.

As described above, the priority between the streams in the dependent relationship can be appropriately determined.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)(Trade Mark)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-122914 filed May 30, 2012, which is hereby incorporated by reference herein in its entirety.

The invention claimed is:

1. An information processing apparatus comprising:
a transmission unit configured to communicate with a reception side apparatus, compare a window size on the reception side apparatus with a maximum frame size and transmit a frame corresponding to the maximum frame size to the reception side apparatus via a network communication if the window size on the reception side is larger than the maximum frame size or transmit a frame corresponding to the window size on the reception side apparatus to the reception side apparatus via the network communication if the window size on the reception side apparatus is smaller than the maximum frame size; and
a setting unit configured to set a maximum frame size of a second stream which is a second logical channel of a communication protocol smaller than a maximum frame size of a first stream which is a parent stream of the second stream and a first logical channel of the communication protocol wherein the first stream and second stream have a stream dependent relationship,
wherein the transmission unit is configured to transmit a frame of the first stream and a frame of the second stream to the reception side apparatus via the network communication,
wherein, if a priority of the first stream is a first priority lower than a second priority and there is no stream higher in priority than the first stream, the setting unit is configured to change the priority of the first stream to the second priority.

2. The information processing apparatus according to claim 1, wherein the setting unit is configured to make a processing time of the first stream longer than a processing time of the second stream.

3. The information processing apparatus according to claim 1, wherein, a first maximum frame size used when determining the window size of the stream in the first priority is smaller than a second maximum frame size used when determining the window size of the stream of the second priority.

4. The information processing apparatus according to claim 1, wherein processing for waiting for a TCP connection request and processing for requesting a TCP connection are performed by a single module of the information processing apparatus.

5. The information processing apparatus according to claim 1, wherein, if a priority of the first stream is the lowest in a range of priorities of the communication protocol, the setting unit sets a priority of the second stream equal to the priority of the first stream.

6. The information processing apparatus according to claim 1, wherein the setting unit is configured to input a priority of the first stream to a header of an IP packet including a frame of the first stream, and inputs the priority of the second stream to a header of an IP packet including a frame of the second stream.

7. An information processing method, comprising:
comparing a window size on a reception side apparatus with a maximum frame size;
transmitting a frame corresponding to the maximum frame size to the reception side apparatus via a network communication if the window size on the reception side apparatus is larger than the maximum frame size or transmitting a frame corresponding to the window size on the reception side apparatus to the reception side apparatus via the network communication if the window size on the reception side apparatus is smaller than the maximum frame size,
setting a maximum frame size of a second stream which is a second logical channel of a communication protocol smaller than a maximum frame size of a first stream which is a parent stream of the second stream and a first logical channel of the communication protocol wherein the first stream and second stream have a stream dependent relationship,
if a priority of the first stream is a first priority lower than a second priority and there is no stream higher in priority than the first stream, changing the priority of the first stream to the second priority higher.

8. The method according to claim 7, further comprising making a processing time of the first stream longer than a processing time of the second stream.

9. The method according to claim 7, wherein, a first maximum frame size user when determining the window size of the stream in the first priority is smaller than a second maximum frame size used when determining the window size of the stream of the second priority.

10. The method according to claim 7, further comprising performing processing for waiting a TCP connection request and processing for requesting a TCP connection are a single module.

11. The method according to claim 7, wherein, if a priority of the first stream is the lowest in a range of priorities of the communication protocol, setting a priority of the second stream equal to the priority of the first stream.

12. The method according to claim 7, further comprising inputting a priority of the first stream to a header of an IP packet including a frame of the first stream and inputs the priority of the second stream to a header of an IP packet including a frame of the second stream.

13. A non-transitory computer-readable storage medium storing a computer program for causing a computer to execute a method for an information processing apparatus, the method comprising:
comparing a window size on a reception side apparatus with maximum frame size; and
transmitting a frame corresponding to the maximum frame size to the reception side apparatus via a network communication if the window size on the reception side apparatus is larger than the maximum frame size or transmitting a frame corresponding to the window size on the reception side apparatus to the reception side apparatus via the network communication if the window size on the reception side apparatus is smaller than the maximum frame size, and
setting a maximum frame size of a second stream which is a second logical channel of a communication protocol smaller than a maximum frame size of a first stream which is a parent stream of the second stream and a first logical channel of the communication protocol wherein the first stream and second stream have a stream dependent relationship, if a priority of the first stream is a first priority lower than a second priority and there is no stream higher in priority than the first stream, changing the priority of the first stream to the second priority higher.

14. The information processing apparatus according to claim 1, wherein a frame of the second stream includes information for identifies the parent stream.

15. The method according to claim 7, wherein a frame of the second stream includes information for identifies the parent stream.

* * * * *